(12) United States Patent
Li et al.

(10) Patent No.: US 6,580,834 B2
(45) Date of Patent: *Jun. 17, 2003

(54) METHOD AND APPARATUS FOR ENCODING AND DECODING SIGNALS

(75) Inventors: Weiping Li, Bethlehem, PA (US); Fan Ling, Bethlehem, PA (US); Hongqiao Sun, Bethlehem, PA (US)

(73) Assignee: Competitive Technologies of PA, Inc., Bethlehem, PA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/989,388

(22) Filed: Dec. 12, 1997

(65) Prior Publication Data

US 2002/0146177 A1 Oct. 10, 2002

Related U.S. Application Data

(60) Provisional application No. 60/048,055, filed on May 30, 1997, provisional application No. 60/052,336, filed on Jul. 11, 1997, and provisional application No. 60/062,910, filed on Oct. 21, 1997.

(51) Int. Cl.[7] .................................................. G06K 9/36
(52) U.S. Cl. ........................ 382/251; 382/240; 382/245
(58) Field of Search ................................. 382/251, 256, 382/248, 236, 250, 240, 232, 233, 245; 375/240.03, 240.11, 240.18–240.2, 240.23–240.25; 351/50, 51

(56) References Cited

U.S. PATENT DOCUMENTS

| | | | | |
|---|---|---|---|---|
| 5,109,451 A | * | 4/1992 | Aono et al. | 382/166 |
| 5,128,756 A | * | 7/1992 | Johnston et al. | 375/133 |
| 5,430,556 A | * | 7/1995 | Ito | 382/251 |
| 5,699,457 A | * | 12/1997 | Adar et al. | 382/239 |
| 5,764,805 A | * | 6/1998 | Martucci et al. | 382/238 |
| 5,815,097 A | * | 9/1998 | Schwartz et al. | 341/51 |
| 5,881,176 A | * | 3/1999 | Keith et al. | 382/248 |
| 5,923,785 A | * | 7/1999 | Dube | 382/240 |

* cited by examiner

*Primary Examiner*—Phuoc Tran
*Assistant Examiner*—Ishrat Sherali
(74) *Attorney, Agent, or Firm*—Martin Novack

(57) ABSTRACT

A method for encoding and decoding an input signal, includes the following steps: applying a transform to the input signal to obtain a transformed signal; quantizing the transformed signal to obtain a sequence of quantized values, the quantized values being representable in the form of ordered binary bits; for each order of said binary bits, encoding a bit plane of the sequence using (run, end) coding to obtain encoded values; and decoding the encoded values to recover the input signal.

26 Claims, 14 Drawing Sheets

7,0,4,0,0,2,0,_ _ _ _ _ _ _ 0
[quantized DCT coefficient values]

FIG. 2

(0,7,0), (1,4,0), (2,2,1)
(run, level, end) coding

[quantized DCT coefficients in
binary bit planes]

[(run, end) binary bit plane coding]

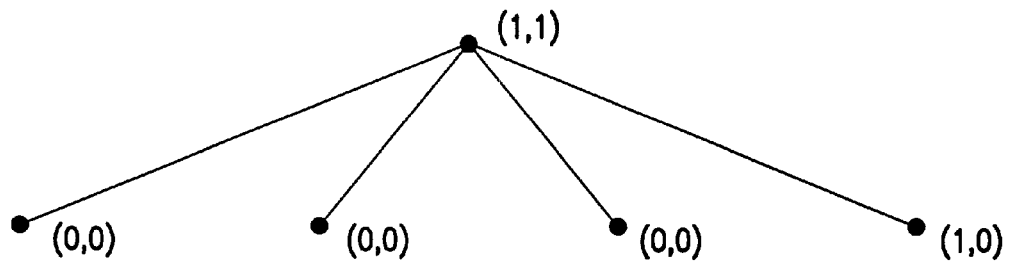
FIG. 7A
(1,1), (0,0), (0,0), (0,0), (1,0)
FIG. 7B
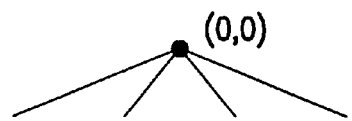
FIG. 8A
(0,0)
FIG. 8B (0,1)
(0,0), (1,0), (0,1), (1,1)
(1,0), (0,0), (0,0), (0,0), (0,0), (0,0), (1,0), (1,1)
0,0,1,0

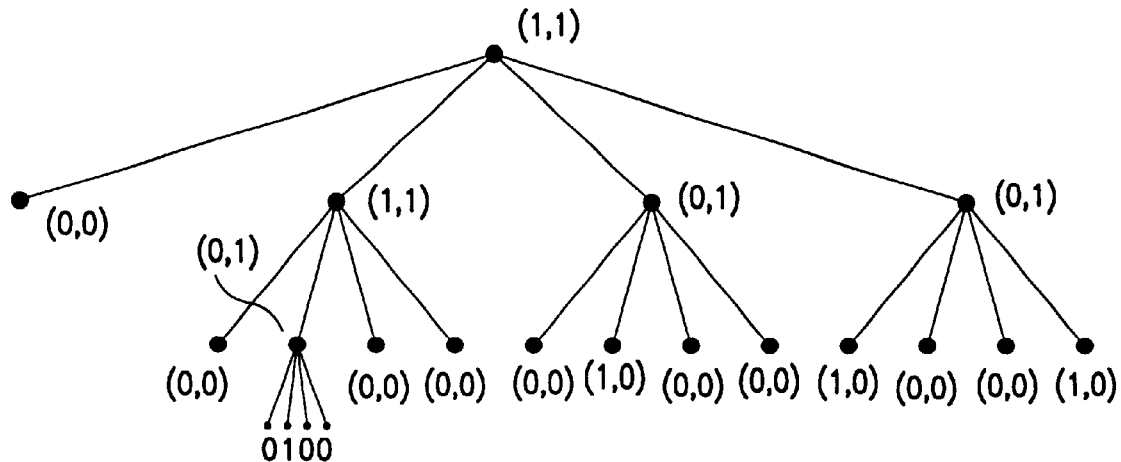
FIG. IOA
(1,1)
(0,0), (1,1), (0,1), (0,1)
(0,0), (0,1), (0,0), (0,0), (0,0), (1,0), (0,0), (0,0), (1,0), (0,0), (0,0), (1,0)
0,1,0,0
FIG. IOB

METHOD AND APPARATUS FOR ENCODING AND DECODING SIGNALS

RELATED APPLICATION

This application claims priority from U.S. Provisional Patent Application No. 60/048,055, filed May 30, 1997, and from U.S. Provisional Patent Application No. 60/052,336 filed Jul. 11, 1997, and from U.S. Provisional Patent Application No. 60/062,910, filed Oct. 21, 1997, and all of said Provisional Patent Application are incorporated herein by reference.

FIELD OF THE INVENTION

This invention relates to encoding and decoding of signals, such as image-representative signals or audio signals, and, more particularly, to a method and apparatus for encoding and decoding such signals to achieve bandwidth compression for efficient storage and/or transmission.

BACKGROUND OF THE INVENTION

Image-representative signals (e.g. video signals) can be digitized, encoded, and subsequently decoded in a manner which substantially reduces the number of encoded bits necessary to obtain a decoded reconstructed image without undue or noticeable degradation in the reconstructed image. Other types of signals, for example audio signals, can also be encoded and decoded to achieve bandwidth compression without undue degradation of the reconstructed signal. Coding methods that use transforms, for example a discrete cosine transform ("DCT") or a wavelet transform, are well known for this purpose and are in widespread use.

In a typical type of DCT coding, an image is divided into blocks, for example blocks of 8×8 pixels. A DCT transform is applied to each block to obtain respective 8×8 DCT coefficients. That is, 64 pixel values are transformed into 64 DCT coefficient values. Because of the nature of typical images, certain efficiencies can be achieved using the DCT coefficients, a substantial number of which may be quantized to zero. After so-called zig-zag ordering, which arranges the DCT coefficients in a sequence that tends to group the smaller or zero valued coefficients together, a type of coding called (run, level, end) coding is utilized. After the (run, level, end) coding, entropy coding is generally applied.

In a typical type of wavelet transform coding, a wavelet transform is applied to achieve wavelet decomposition of an image, and a wavelet "tree" is formed. Then, a type of coding called "zero-tree" coding is employed, wherein, at each node of the tree, the value at the node is encoded, together with an indication of whether the children, grandchildren etc. nodes (collectively, the "progeny" nodes) of the node being coded are all zero. If so, it will not be necessary to code any of the progeny, and this can lead to certain coding efficiencies. The coded zero-tree information can then be entropy coded.

In the above described types of coding, as in other similar coding, the "level" or "value" part of the code can tend to require a relatively large number of different codes for its representation, and this can tend to reduce the advantages of the coding and/or the advantages of the subsequent entropy coding.

It is among the objects of the present invention to provide improvements in encoding and decoding techniques and apparatus of the general type described, and to be responsive to the limitations of such techniques and apparatus in the prior art.

SUMMARY OF THE INVENTION

In accordance with a feature of the present invention, a bit plane approach is used in representing coded levels or values. Although, this approach will require more codes to be generated (since each bit plane is separately encoded), the codes themselves, and/or the entropy codes therefor, will require less bits for their representation, and in many cases the net result will be a substantial reduction in the bits necessary to encode the original signal.

In accordance with an embodiment of the invention, there is disclosed a method for encoding and decoding an input signal, comprising the following steps: applying a transform to said signal to obtain a transformed signal; quantizing the transformed signal to obtain a sequence of quantized values, the quantized values being representable in the form of ordered digital bits; for each order of said digital bits, encoding a bit plane of the sequence to obtain encoded values; and decoding the encoded values to recover said input signal.

In a preferred embodiment of the invention, the ordered digital bits are binary bits, and there are several orders of said bits. In this embodiment, the step of quantizing the transformed signal to obtain a sequence of quantized values includes: determining the largest of the quantized values; and determining the number of orders, N, of said binary bits as the number of binary bits necessary to represent said largest value.

In accordance with another embodiment of the invention, there is disclosed a method for encoding and decoding an input signal, comprising the following steps: applying a wavelet transform to the signal to obtain a transformed signal; forming a wavelet tree from the transformed signal, elements of the tree having values that depend on coefficients of the transformed signal; quantizing the wavelet tree element values, the quantized element values being representable in the form of ordered digital bits; for each order of said digital bits, encoding a bit plane of said wavelet tree element values to obtain encoded values; and decoding the encoded values to recover the input signal.

Further features and advantages of the invention will become more readily apparent from the following detailed description when taken in conjunction with the accompanying drawings.

BRIEF DESCRIPTION OF THE DRAWINGS

FIG. 2 is a simplified illustration of quantized DCT coefficient values, such as after zig-zag ordering.

FIG. 3 is an illustration of (run, level, end) coding performed on the coefficient values of the FIG. 2 example.

FIG. 4 shows the quantized DCT coefficient values of FIG. 2 represented in the form of ordered binary bits, each row being an illustrated bit plane.

FIG. 5 illustrates (run, end) coding as performed on the bit planes of the FIG. 4 example.

FIG. 7A represents a sub-tree of the wavelet tree of FIG. 6A, for the highest order bit plane of the wavelet tree, and FIG. 7B shows the zero tree coding for the sub-tree of FIG. 7A.

FIG. 8A represents a sub-tree of the wavelet tree of FIG. 6A, for the second highest order bit plane of the wavelet tree, and FIG. 8B shows the zero tree coding for the sub-tree of FIG. 8A.

FIG. 10A represents a sub-tree of the wavelet tree of FIG. 6A, for the lowest order bit plane of the wavelet tree, and FIG. 10B shows the zero tree coding for the sub-tree of FIG. 10A.

DETAILED DESCRIPTION

Figure 1:
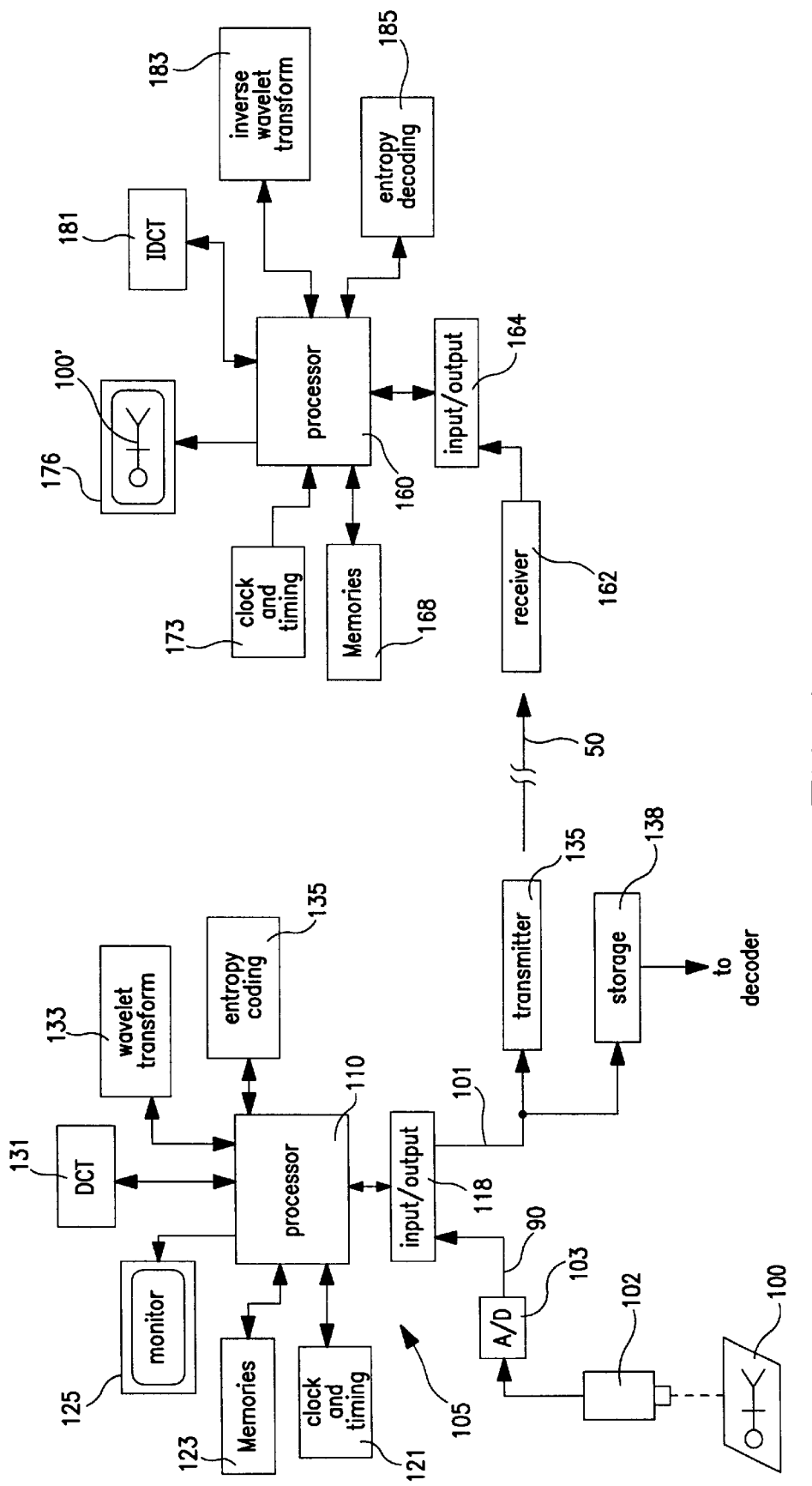
FIG. 1 is a block diagram of an apparatus which can be used to practice embodiments of the invention.

Referring to FIG. 1, there is shown a block diagram of an apparatus which can be used in practicing embodiments of the invention for encoding and decoding images 100. A video camera 102, or other source of video signal, produces an array of pixel-representative signals that are coupled to an analog-to-digital converter 103, which is, in turn, coupled to the processor 110 of an encoder 105. When programmed in the manner to be described, the processor 110 and its associated circuits can be used to implement embodiments of the invention. The processor 110 may be any suitable processor, for example an electronic digital processor or microprocessor. It will be understood that any general purpose or special purpose processor, or other machine or circuitry that can perform the functions described herein, electronically, optically, or by other means, can be utilized. The processor 110, which for purposes of the particular described embodiments hereof can be considered as the processor or CPU of a general purpose electronic digital computer, such as a Model Ultra-1 sold by Sun Microsystems, Inc., will typically include memories 123, clock and timing circuitry 121, input/output functions 118 and monitor 125, which may all be of conventional types. In the present embodiment blocks 131 and 133 represent functions that can be implemented in hardware, software, or a combination thereof. The block 131 represents a discrete cosine transform function that can be implemented using commercially available DCT chips or combinations of such chips with known software, the block 133 represents a wavelet transform that can be implemented using commercially available wavelet transform chips, or combinations of such chips with known software that performs wavelet decompositions and/or wavelet tree processing, and the block 135 represents an entropy coding function that can be implemented using commercially available hardware and/or software.

With the processor appropriately programmed, as described hereinbelow, an encoded output signal 101 is produced which is a compressed version of the input signal 90 and requires less bandwidth and/or less memory for storage. In the illustration of FIG. 1, the encoded signal 101 is shown as being coupled to a transmitter 135 for transmission over a communications medium (e.g. air, cable, fiber optical link, microwave link, etc.) 50 to a receiver 162. The encoded signal is also illustrated as being coupled to a storage medium 138, which may alternatively be associated with or part of the processor subsystem 110, and which has an output that can be decoded using the decoder to be described.

Coupled with the receiver 162 is a decoder 155 that includes a similar processor 160 (which will preferably be a microprocessor in decoder equipment) and associated peripherals and circuits of similar type to those described in the encoder. These include input/output circuitry 164, memories 168, clock and timing circuitry 173, and a monitor 176 that can display decoded video 100'. Also provided are blocks 181, 183, and 185 that represent functions which (like their counterparts 131, 133, and 135 in the encoder) can be implemented in hardware, software, or a combination thereof. The block 181 represents an inverse discrete cosine transform function that can be implemented using commercially available IDCT chips or combinations of such chips with known software, the block 183 represents an inverse wavelet transform function that can be implemented using commercially available inverse wavelet transform chips, or combinations of such chips with known software, and the block 185 represents entropy decoding that can be implemented using commercially available hardware and/or software.

FIGS. 2–5 are useful in understanding an example of a prior art type of so-called (run, level, end) coding. In this example, assume that the data in FIG. 2 represents quantized DCT coefficient values (e.g. 64 of them) for an individual block of video data; e.g. quantized coefficients that have been conventionally zig-zag ordered. In this exemplary data, the first quantized value is 7, the third quantized value is 4, the sixth quantized value is 2, and all other quantized values are zero. Conventional (run, level, end) coding of the FIG. 2 data is shown in FIG. 3. Specifically, each coded set of three numbers respectively represents the run of zeros before a non-zero value, the non-zero value itself, and an indication of whether the non-zero value is the last non-zero value of the data string (a "1" indicating that it is the last non-zero value, and a "0" indicating that it is not the last non-zero value). Thus, in this example, the first set of three values, (0,7,0), represents a run of no zeros (the "0") before the first non-zero value, the non-zero value itself (the "7"), and an indication that the non-zero value is not the last non-zero value (the "0"). The next set of three values (1,4,0), represents a run of one zero (the "1") before the next non-zero value, the non-zero value itself (the "4") and an indication that the non-zero value is not the last non-zero value (the "0"). The last set of three values (2,2,1), represents a run of two zeros (the "2") before the next non-zero value, the non-zero value itself (the "2"), and an indication that the non-zero value is the last non-zero value (the "1").

FIG. 4 shows the quantized DCT coefficient values of FIG. 2 set forth as ordered binary bits, with the sequence being in binary bit plane format; i.e., with the "4's" bit plane as the top row, the "2's" bit plane as the next row, and the "1's" bit plane as the bottom row.

FIG. 5 shows the (run, end) coding of the FIG. 4 data in accordance with an embodiment hereof. Note that "level" is not required since the only possible non-zero value in any bit plane is a "1". Thus, in this case, each set of two numbers respectively represents the run of zeros before the next non-zero value (which would be a 1), followed by an indication of whether the non-zero value is the last non-zero value. In FIG. 5, the top row of number pairs codes the "4's" bit plane, the next row of number pairs codes the "2's" bit plane, and the bottom row of number pairs codes the "1's" bit plane. [The rows and parentheses in FIG. 5 and other coding illustrations are for ease of explanation, it being understood that the coded bitstream may just contain the coded bits in sequence.] In the top row, for example, the (0,0) represents a run of no zeros before the first non-zero value, and an indication that the non-zero value is not the last non-zero value. The (1,1) represents a run of one zero before the next non-zero value, and an indication that the non-zero value is the last non-zero value. The next two bit planes are encoded in the same way. Specifically, in the 2's bit plane, the (0,0) represents a run of no zeros before the first non-zero value and an indication that the non-zero value is not the last non-zero value, and the (4,1) represents a run of four zeros before the next non-zero value and an indication that the non-zero value is the last non-zero value. In the 1's bit plane, the (0,1) represents a run of no zeros before the first non-zero value and an indication that the non-zero value is the last non-zero value. Thus, the encoded bit stream of FIG. 5 can be presented as "0,0,1,1,0,0,4,1,0,1".

FIGS. 6–10 show wavelet tree diagrams that illustrate an example of a further embodiment hereof. FIG. 6A illustrates a conventional type of tree obtained by applying a wavelet function to a signal, such as a video or audio signal to achieve wavelet decomposition. Each root or "node" has four branches, each of which leads, in turn, to another node, except at the third node level (in this example) where each node has four branches that are sometimes called "leaves". In this illustrative example, the values shown in FIG. 6A are in decimal form and the largest value at any node or leaf (e.g. after scaler quantization of the values) is 10. [Nodes and leaves of the tree are sometimes individually or collectively referred to as "elements" of the tree.] The value at the first level (top) node is 9, the values at the second level nodes, taken from left to right, respectively, are 0, 3, 0, 10, and so on. It is a characteristic of the wavelet encoding that at each successive node level of a wavelet tree the values tend to be smaller, and zeros tend to be more likely at the last (leaf) level. A conventional type of "zero tree" coding uses a code that indicates the value at a node and also indicates whether all the progeny (children, grandchildren, etc.) of the node, are zeros. When all progeny are zero, it is not necessary to encode any of the progeny of such a node, since during decoding all such progeny can be assigned a value of zero. Thus, in typical notation, each node with progeny is represented by two numbers; a first number representing the value at the node, and a second number (which can be one binary bit) indicating whether or not all progeny of the node are zero. In the typical wavelet tree example of FIG. 6A, these codes are developed as shown in FIG. 6B. As seen, at the first (top) node level, where the code is (9,1), the number 9 represents the value at the node, and the number 1 indicates that not all progeny of the node are zero. At the second node level, there are four nodes, with respective number pair codes (for the nodes from left to right) of (0,0), (3,1), (0,1), (10,1). In the first (leftmost) code, the first number 0 represents the value at the node, and the second number 0 is an indication that all progeny of the node have the value zero. In the second number pair code, the first number 3 represents the value at the node, and the second number 1 indicates that not all progeny of this node have the value zero. In the third number pair code, the first number 0 represents the value at the node, and the second number 1 indicates that not all progeny of this node have the value zero. In the fourth number pair code, the first number 10 represents the value at the node, and the second number 1 indicates that not all progeny of this node have the value zero.

At the third node level, there are sixteen nodes (four children of each of the four nodes at the second node level). However, there are only twelve number pairs. This is because it is not necessary to encode the progeny of the leftmost node at the second level that was coded to indicate that its progeny are all zero. At the third node level, there are only two nodes having progeny that are not all zero. Accordingly, at the fourth node level (which is the last level, so it is actually a "leaf" level) there are eight single numbers; that is, four from each of said two nodes at the third node level which have progeny that are not all zero. At the last level, only a single number is needed for each element, to represent the value at the element, since there are no further progeny.

Figures 6A, 6B:
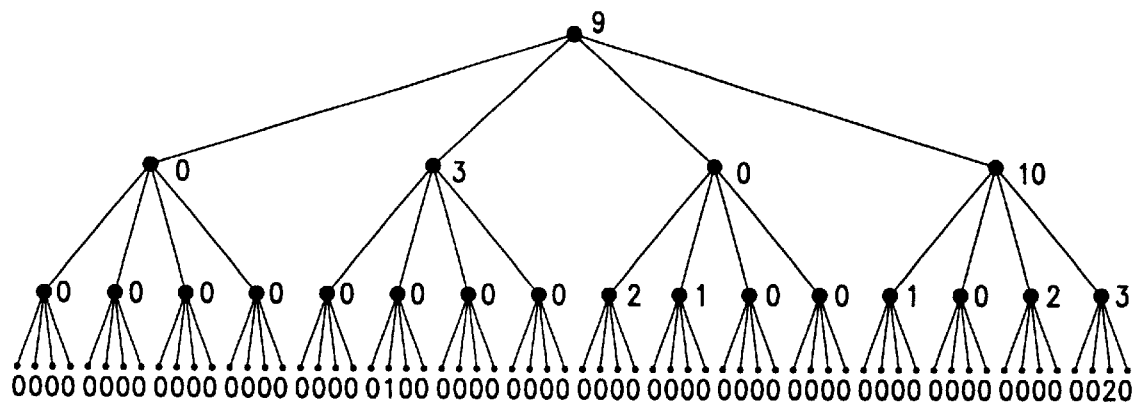
FIG. 6 illustrates an example of a conventional type of wavelet tree with examples of element values indicated at nodes and leaves of the tree.

In the prior art type of zero tree coding described in conjunction with FIGS. 6A and 6B, the value at each element of the tree was coded in the manner described, and represented by a single number (in decimal form, in the illustrated example, although the form of the number is not, per se, significant). In an embodiment hereof, a single tree of element values is transformed into a plurality of "sub-trees", one for each bit plane (e.g. binary bit plane) of the element values in the original tree. Then, each of the plurality of sub-trees can be encoded using small numbers (e.g. a single binary bit) to represent the value at each element of each said sub-tree.

The sub-trees associated with the tree of FIG. 6A can be envisioned by considering the ordered binary representations of the element values, and then considering each bit plane of the values as a separate sub-tree. In the example of FIG. 6A, the largest element value is 10 (decimal), which would require four binary bits for its representation. Therefore, for this example, there would be four bit planes and four sub-trees.

In the present example, the sub-tree for the most significant bit plane is considered first (although any desired order can be used). This first sub-tree is shown in FIG. 7A and the coding therefor is shown in FIG. 7B. This sub-tree has only two elements (nodes, in this case) with non-zero values. Specifically, the value 10 (decimal) at the first node level is 1010 in binary form, and the value 9 (decimal) at the rightmost node of the second node level is 1001 in binary form, the underlined bits being in the most significant bit plane. All other element values in the original tree of FIG. 6A have a zero in the most significant bit position of a four bit binary representation of element values. Thus, in the sub-tree of FIG. 7A, the node at the first node level has a value of 1 [the first number of the coded, number pair (1,1)], and also has a designation ("1") that not all of its progeny are zero [the second number of the coded number pair (1,1)]. At the second node level of the sub-tree of FIG. 7A, the respective coded number pairs (using left to right convention throughout in the exemplary embodiments hereof) are (0,0), (0,0), (0,0), (1,0). This reflects the fact that the rightmost node of this node level has a value of 1 (the other three being zero), and the fact that all progeny of these nodes have the value zero. [In this and the other sub-tree representations hereof, when all progeny of a particular node have a value zero, nothing below the node is shown.] The coding for the FIG. 7A sub-tree is thus shown in FIG. 7B as being, in continuous form, (1,1), (0,0), (0,0), (0,0), (1,0).

The sub-tree for the second most significant bit plane is shown in FIG. 8A, and the coding therefor is shown in FIG. 8B. At this bit plane, all elements of the sub-tree are zero (that is, none of the element values in the original tree have a 1 in the second most significant bit position of their four bit binary representation). The coding, as shown in FIG. 8B, is simply (0,0).

Figures 9A, 9B:
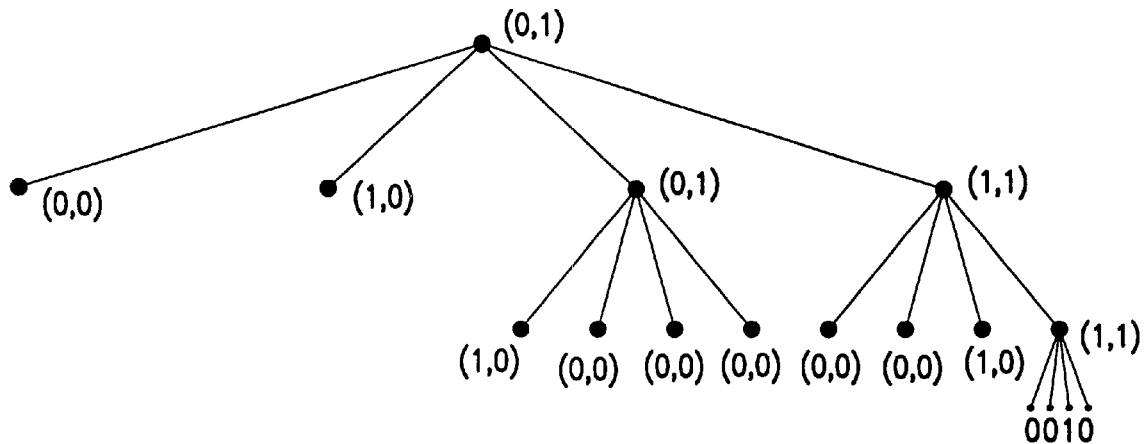
FIG. 9A represents a sub-tree of the wavelet tree of FIG. 6A, for the third highest order bit plane of the wavelet tree.
FIG. 9B shows the zero tree coding for the sub-tree of FIG. 9A.

The sub-tree for the third most significant bit plane is shown in FIG. 9A, and the coding therefor is shown in FIG. 9B. In this case, some examples of the element values are as follows: the value 9 (decimal) from the original tree is 1001 binary, so the corresponding value for this bit plane is 0; the value 3 (decimal) from the original tree is 0011 so the corresponding value for this bit plane is 1; the value 10 (decimal) from the original tree is 1010 binary, so the corresponding value for this bit plane is 1; and so on. The coding for this bit plane is shown in FIG. 9B. It is seen that only single numbers (not number pairs) are needed at the leaf level, as previously described.

The sub-tree for the fourth most significant bit plane is shown in FIG. 10A and the coding therefor is shown in FIG. 10B. In this case, some examples of the element values are as follows: the value 9 (decimal) from the original tree is 1001 binary, so the corresponding value for this bit plane is 1; the value 3 (decimal) from the original tree is 0011 binary, so the corresponding value for this bit plane is 1; the value 10 (decimal) from the original tree is 1010 binary, so the corresponding value for this bit plane is 0; and so on. The coding for this bit plane is shown in FIG. 10B.

It will be understood that the bit plane coding hereof can, if desired, be applied to a part of a sequence. For example, in coding quantized DCT coefficients that have been zig-zag ordered, the coefficients at the beginning of the sequence will generally tend to have more non-zero values, so the beginning of the sequence may by advantageously coded using a different technique than the rest of the sequence. In an example of the present embodiment, consider a sequence of 64 quantized DCT coefficients in which N bits are needed to represent the largest absolute value coefficient. N is the number of bit planes to be used. In this embodiment, each bit plane is divided into two segments, the first eight bits of a bit plane forming the first segment and the last 56 bits of a bit plane forming the second segment. The first segment is coded using a coding method other than (run, end), and the second segment is coded using a (run, end) coding method. For example, the first segment can be coded using an (index, end of plane, end of block) coding. The "index" represents the pattern of the eight bits (which is shown as a decimal representation in this example), the "end of plane" bit indicates whether there are any 1's in the second segment of the same bit plane, and the "end of block" bit indicates whether it is the last of the bit planes. The second segment is coded in the (run, end) manner previously described for coding individual bit planes. [In the prior embodiments, the number of bit planes can be encoded for use at the decoder. In this embodiment, the number of bit planes can be implicit in the coding. In the present example sign bits are considered, and the sign bits of all non-zero coefficients can be put at the end of the codes for coding the bit planes. To illustrate the present embodiment, assume that the absolute values and signs of the quantized DCT coefficients after zigzag ordering are given as follows:

10,0,6,0,0,3,0,2,2,0,0,2,0,0,1,0, . . . 0,0

0,0,0,0,0,1,0,0,1,0,0,0,0,0,1,0, . . . 0,0

The maximum absolute value is found to be 10 (decimal) and the minimum number of bits to represent the 10 in the binary format (1010) is N=4. Therefore, there are 4 bit-planes to be coded. Writing every absolute value in the binary format using 4 bits, the 4 bit-planes are formed as follows:

1,0,0,0,0,0,0,0,0,0,0,0,0,0,0,0, . . . 0,0 (MSB-plane)

0,0,1,0,0,0,0,0,0,0,0,0,0,0,0,0, . . . 0,0 (Second MSB-plane)

1,0,1,0,0,1,0,1,1,0,0,1,0,0,0,0, . . . 0,0 (Third MSB-plane)

0,0,0,0,0,1,0,0,0,0,0,0,0,0,1,0, . . . 0,0 (Fourth MSB-plane or LSB-plane)

Dividing each bit-plane into two segments gives (1,0,0,0,0,0,0,0),(0,0,0,0,0,0,0,0, . . . 0,0) (MSB-plane)

(0,0,1,0,0,0,0,0),(0,0,0,0,0,0,0,0, . . . 0,0) (Second MSB-plane)

(1,0,1,0,0,1,0,1),(1,0,0,1,0,0,0,0, . . . 0,0) (Third MSB-plane)

(0,0,0,0,0,1,0,0),(0,0,0,0,0,0,1,0, . . . 0,0) (Fourth MSB-plane or LSB-plane)

Converting the bits of the first segment of each bit-lane into (Index, EOP, EOB) symbols and the bits of the second segment of each bit-lane into (Run, EOP, EOB) symbols, where EOB is used in both segments for generality, gives

| First segment | Second segment | |
|---|---|---|
| (1, 1, 0) | | (MSB-plane) |
| (4, 1, 0) | | (Second MSB-plane) |
| (165, 0, 0) | (0, 0, 0), (2, 1, 0) | (Third MSB-plane) |
| (32, 0, 0) | (6,1,1) | (Fourth MSB-plane or LSB-plane) |

Therefore, there are seven symbols (0,1,2,4,6,32,165) to be coded using, for example, variable length code ("VLC", a type of entropy code) tables. Based on their locations in the bit-planes, different VLC tables are used for coding them. The sign bits of the non-zero DCT coefficients are put after the codes of these symbols. The bitstream then looks as follows: code (1,1,0), code (4,1,0), code (165,0,0), code (0,0,0), code (2,1,0), code (32,0,0), code (6,1,1), 0,0,1,0,1, 0,1 Preferably, to enable signal-to-noise ratio ("SNR") scalability, a sign bit should follow the symbol for the first bit of 1 in the corresponding absolute value. In this example, the bitstream order would be as follows: code (1,1,0),0, code (4,1,0),0, code (165,0,0),1,0, code (0,0,0),1, code (2,1,0),0, code (32,0,0), code (6,1,1),1.

Figure 11:
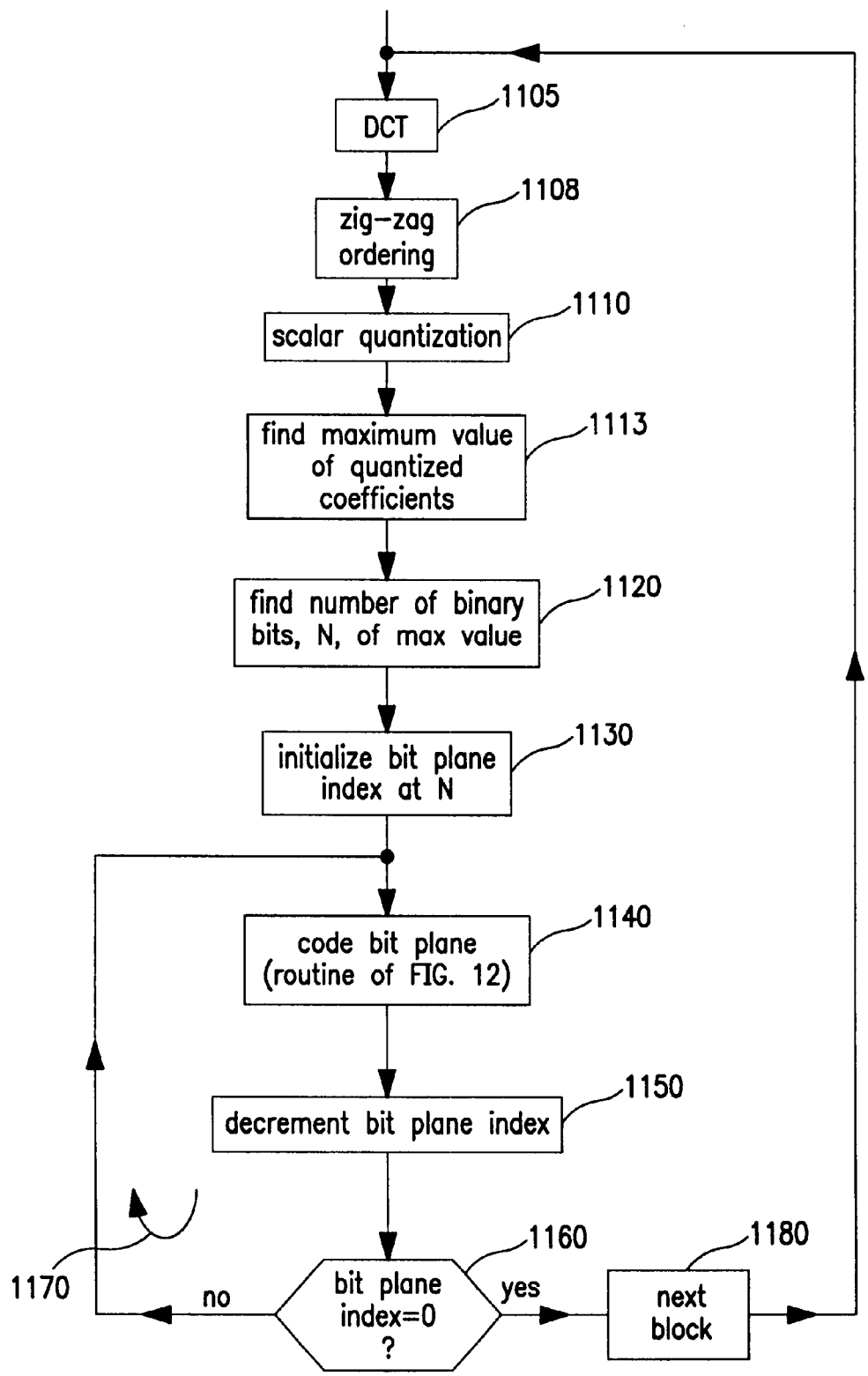
FIG. 11 is a flow diagram of a routine for controlling a processor to perform encoding in accordance with an embodiment of the invention in the context of a DCT encoding technique.

Referring to FIG. 11, there is shown a flow diagram of a routine that can be used to control a processor, such as the encoder processor 110 of FIG. 1, to implement encoding in accordance with an embodiment of the invention. In the present embodiment, the encoding is performed on DCT coefficients, although it will be understood that the invention has application to encoding other forms of data, for example other transforms. The block 1105 represents DCT encoding of the data signal which, in this example, is an audio and/or video signal. The DCT encoding can be performed, for example, using the commercially available DCT chip or chips represented by the block 131, or by any suitable means. The obtained DCT coefficients are then subjected to zigzag ordering, as represented by the block 1108. Zigzag ordering is well known in the art, and involves ordering of the coefficients in a manner that tends, on a statistical basis, to group the higher valued DCT coefficients (of a block of DCT coefficients) at one end of a string of coefficients and to group the lower valued coefficients at the other end of the string. For example, for the most probable case on a statistical basis, the higher valued coefficients will tend to be in the upper left hand corner of a block of DCT coefficients and the lower valued coefficients will tend to be in the lower right hand corner of the block of DCT coefficients. Accordingly, the zigzag ordering can start in the upper left hand corner and proceed in a zigzag fashion diagonally to terminate in the lower right hand corner. Thus, if 64 DCT coefficients are arranged in an 8×8 array with the first row of coefficients designated (0,0), (0,1), (0,2), . . . , (0,7), and the second row coefficients designated (1,1), (1,1), (1,2) . . . , (1,7) and the last row of coefficients designated (7,0), (7,1), (7,2), . . . , (7,7), the zigzag ordering would start by taking the coefficient (0,0) first, the coefficient (0,1) second, the coefficient (1,0) third, the coefficient (2,0) fourth, the coefficient (1,1) fifth, the coefficient (0,2) sixth, the coefficient (0,3) seventh, the coefficient (1,2) eighth, etc., with this diagonal pattern continuing until the bottom right corner coefficient (7,7) is reached. After zigzag ordering (block 1108) the coefficients are scaler quantized (block 1110), which routinely involves dividing by a number and rounding. The block 1113 represents finding the absolute value of the largest DCT coefficient, and the block 1120 represents determining the number of binary bits needed to represent this largest value. This number of bits will be the number of bit planes to be used in the present embodiment.

Continuing with the description of the flow diagram of FIG. 11, the block 1130 represents initializing of a bit plane index at N, which was the previously determined number of bits to represent the largest quantized DCT coefficient. The block 1140 is then entered, this block representing the coding of the current bit plane. The coding of block 1340 is described in further detail in conjunction with the flow diagram of FIG. 12. The bit plane index is then decremented, as represented by block 1150, and inquiry is made (decision block 1160) as to whether the bit plane index is zero. If not, the block 1140 is re-entered for coding of the next bit plane. The loop 1170 then continues until all bit planes have been coded, whereupon the inquiry of block 1160 will be answered in the affirmative. The next block of data (e.g., video-representative signals) can then be input (block 1180), and the block 1105 is re-entered for further processing as described. After this coding entropy coding can be applied (e.g. block 135 of FIG. 1).

Figure 12:
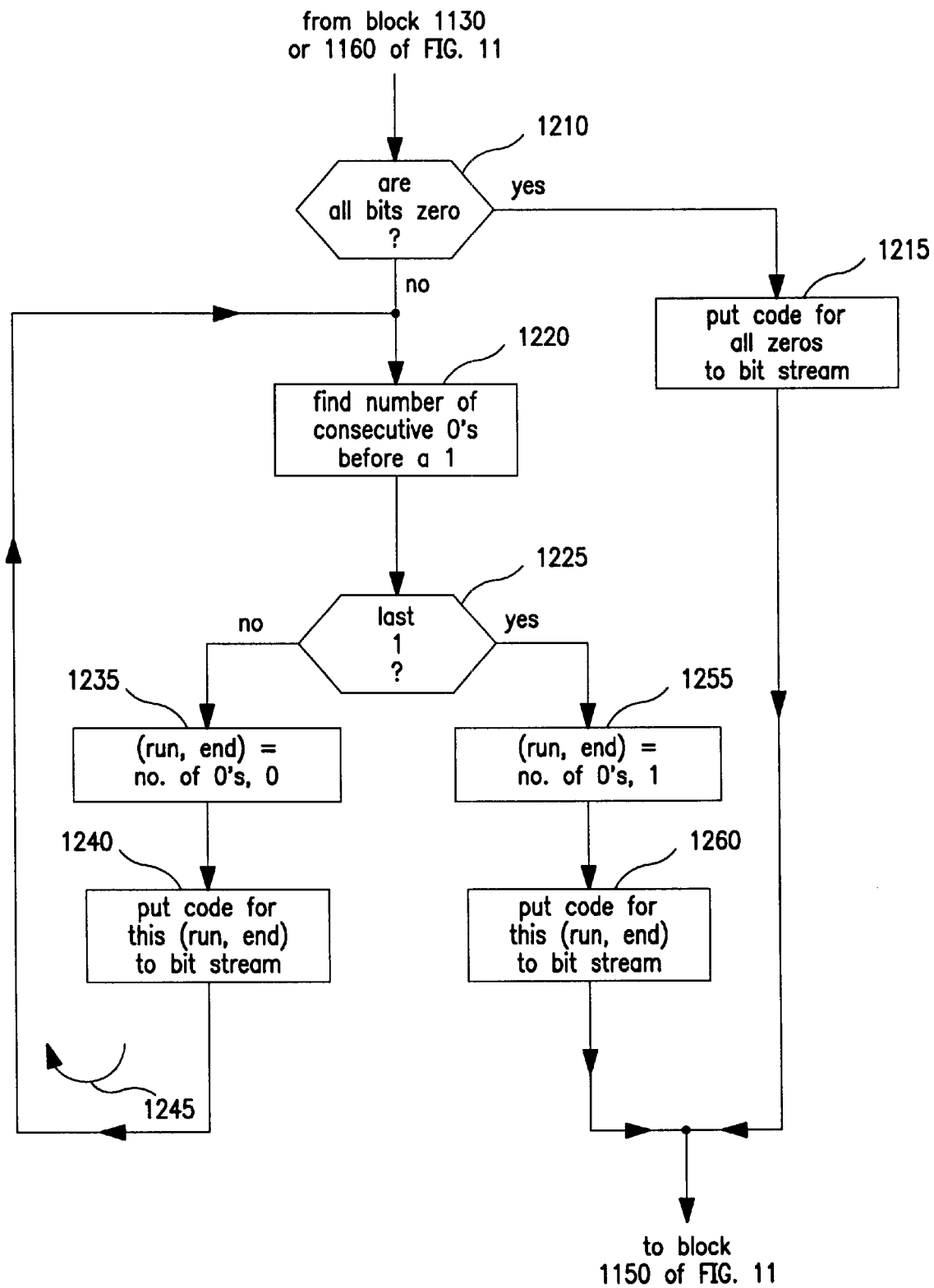
FIG. 12 is a flow diagram of a routine represented by the block 1140 of FIG. 11.

Referring to FIG. 12, there is shown a flow diagram of a routine for the coding of a bit plane as represented by the block 1140 of FIG. 11. Determination is made (decision block 1210) as to whether all bits of the bit plane being processed are zero. If so, a code representing all zeros (e.g. an entropy code therefor, in this embodiment) is put in the coded bit stream (block 1215). If not, however, the block 1220 is entered. The block 1220 represents the determination of the number of consecutive 0's before a 1; that is, the "run" of 0's. Determination is then made (decision block 1225) as to whether this 1 is the last 1 for the present bit plane. If not, the absence of an "end" is coded as 0 and (run, end) is coded as (number of 0's, 0), as represented by the block 1235. An entropy code for this (run, end) code is then put on the coded bit stream, as represented by the block 1240. The loop 1245 continues until the inquiry of decision block 1225 is answered in the affirmative (that is, the last 1 for the present bit plane has be reached), whereupon the block 1255 is entered, this block representing the coding of (run, end) as (number of 0's, 1), where the "1" designates that it is the last 1 for the present bit plane. An entropy code for this (run, end) code is then put on the coded bit stream, as represented by the block 1260, and the block 1150 of FIG. 11 is then entered.

Figure 13:
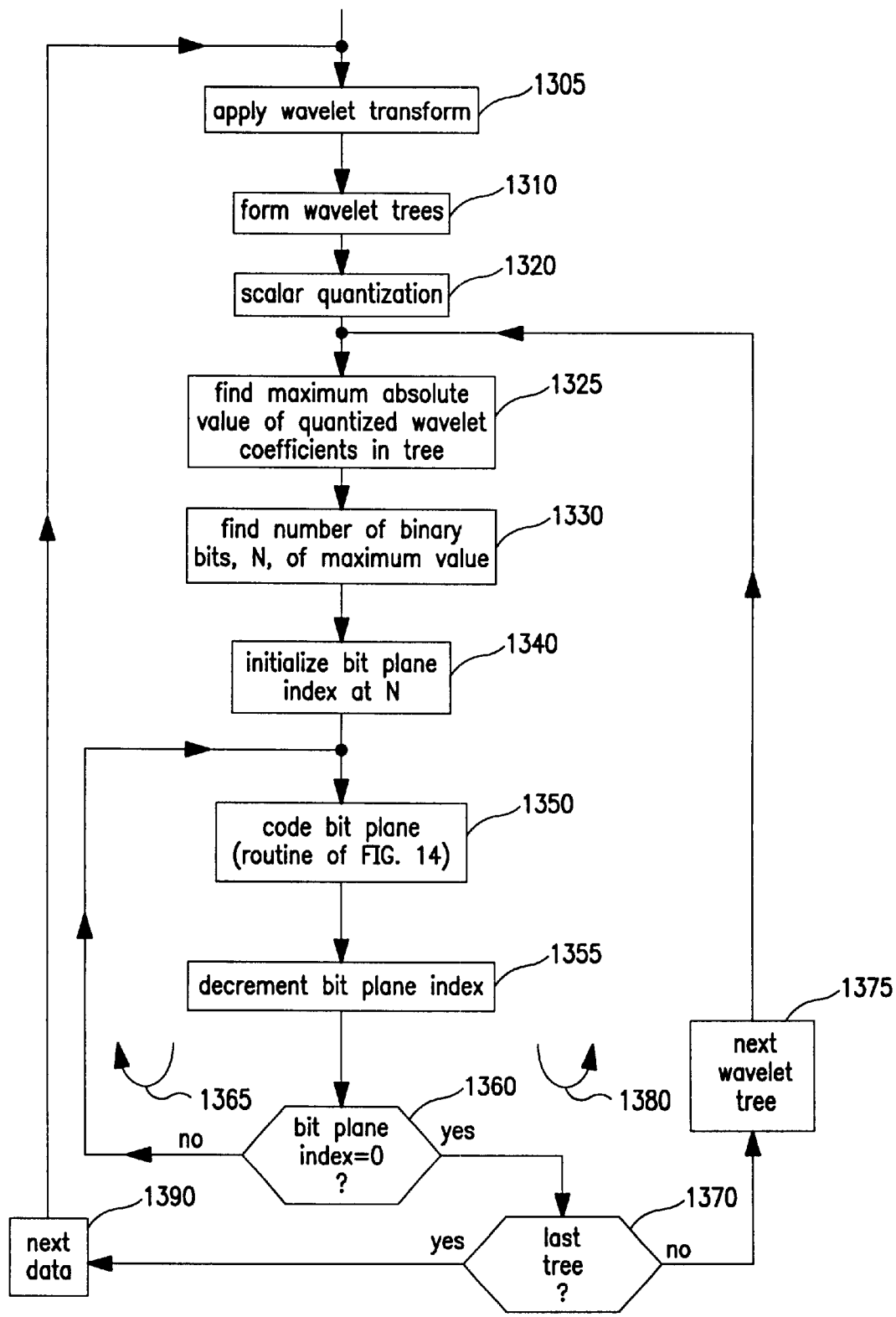
FIG. 13 is a flow diagram of a routine for controlling a processor to perform encoding in accordance with an embodiment of the invention in the context of a wavelet encoding technique.

Referring to FIG. 13, there is shown a flow diagram of a routine for controlling a processor, such as the encoder processor 110 of FIG. 1, to practice a technique hereof, as previously described, wherein values in a wavelet tree are encoded using the bit plane coding hereof. The block 1305 represents applying a wavelet transform to the data (in this example, the video signal data as in FIG. 1), and the block 1310 represents forming a wavelet tree, such as the prior art type of wavelet tree illustrated in FIG. 6A above. These processes are well known in the art, and any suitable wavelet transform can be used. The block 1320 is then entered, this block representing scalar quantization of the values in the wavelet tree. As before, this can be implemented by the dividing by a number and rounding. The block 1325 represents finding the absolute value of the largest quantized coefficient of the wavelet coefficients of the tree, and the block 1330 represents determining the number of binary bits needed to represent this largest value. As before, this number of bits will be the number of bit planes to be used in the present embodiment. In this case, the number of bit planes N can also be considered as the number of sub-trees, as previously described in conjunction with FIGS. 7A through 10B. The bit plane (or sub-tree) index is initialized at N, as represented by the block 1340. The values for this bit plane of the wavelet tree (that is, the binary values in the wavelet sub-tree, as previously described) are then encoded, as represented by the block 1350, and as described in conjunction with the routine described in conjunction with FIG. 14. The bit plane index is then decremented (block 1355), and inquiry is made (decision block 1360) as to whether the bit plane index has reached zero. If not, the block 1350 is re-entered for processing of the next bit plane (that is, the next wavelet sub-tree). The loop 1365 then continues until all bit planes have been processed, whereupon the inquiry of decision block 1360 will be answered in the affirmative. Determination is then made (decision block 1370) as to whether the last wavelet tree for the current data has been processed. If not, the next wavelet tree is considered (block 1375), and the block 1325 is re-entered for processing the next wavelet tree. The loop 1380 then continues until the inquiry of the block 1370 is answered in the affirmative. The next block of data (e.g. video representative signals in this example) can then be input (block 1390). As before, entropy coding can be applied (e.g. block 135 of FIG. 1).

Figure 14:
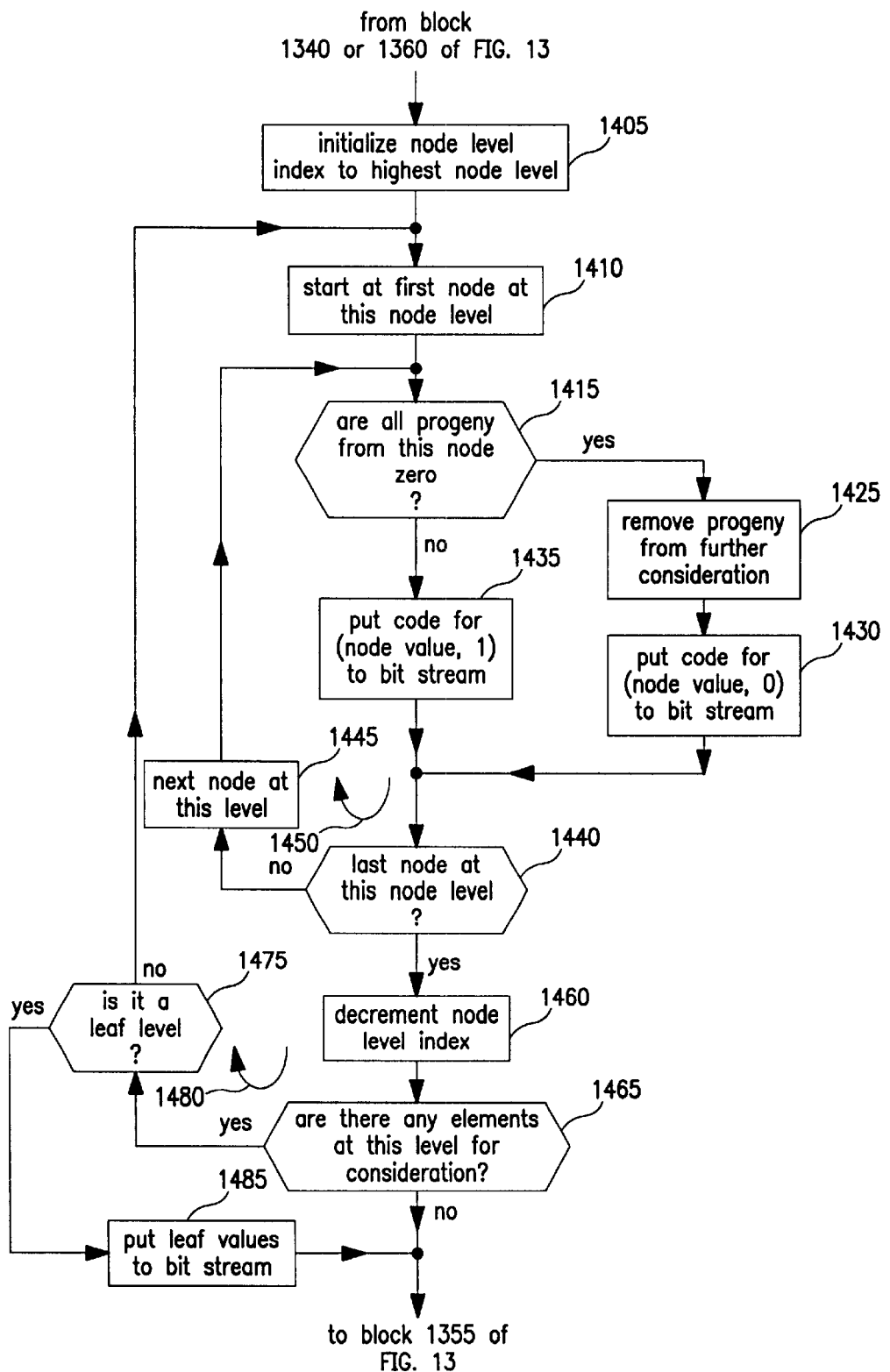
FIG. 14 is flow diagram of a routine represented by the block 1350 of FIG. 13.

Referring to FIG. 14, there is shown a flow diagram of a routine as represented by the block 1350 of FIG. 13 for coding one bit plane of the wavelet tree (that is, for coding a single sub-tree, as described, for example, in conjunction with FIGS. 7A through 10B). The block 1405 represents initializing a node level index to the highest node level of the wavelet sub-tree (for example, in the wavelet sub-trees for the tree of FIG. 6A, there would be four levels of nodes (or elements). The block 1410 represents starting at the first node of the present level (e.g. for left-to-right processing as in the examples hereof). Determination is made (decision block 1415) as to whether all progeny of this node are zero. If so, all progeny of the node are removed from further consideration (block 1425) and a code for (node value, 0) is put to the bit stream (block 1430). If not, a code for (node value, 1) is put to the bit stream (block 1435). The decision block 1440 is then entered, and determination is made as to whether last node at this node level (that is, the rightmost node, for the example of the processing hereof) has been reached. If not, the next node at this level is considered (block 1445), the block 1415 is re-entered, and the loop 1450 continues until all nodes at the current level have been considered. The inquiry of block 1440 will then be answered in the affirmative, and the node level index will be decremented (block 1460). Determination is then made (for this new node level), as represented by the decision block 1465, as to whether there are any elements at this node level for consideration. If not, the processing for this sub-tree is finished, and return is made to the block 1355 of FIG. 13. If so, however, determination is made (decision block 1475) as to whether the current level is the leaf level. If not, the block 1410 is re-entered, and the loop 1480 continues, for processing of all node levels, until the leaf level is reached, whereupon the inquiry of block 1475 will be answered in the affirmative, the block 1485 will be entered for putting the leaf values to the bit stream, and the return implemented to block 1355 of FIG. 13.

Figure 15:
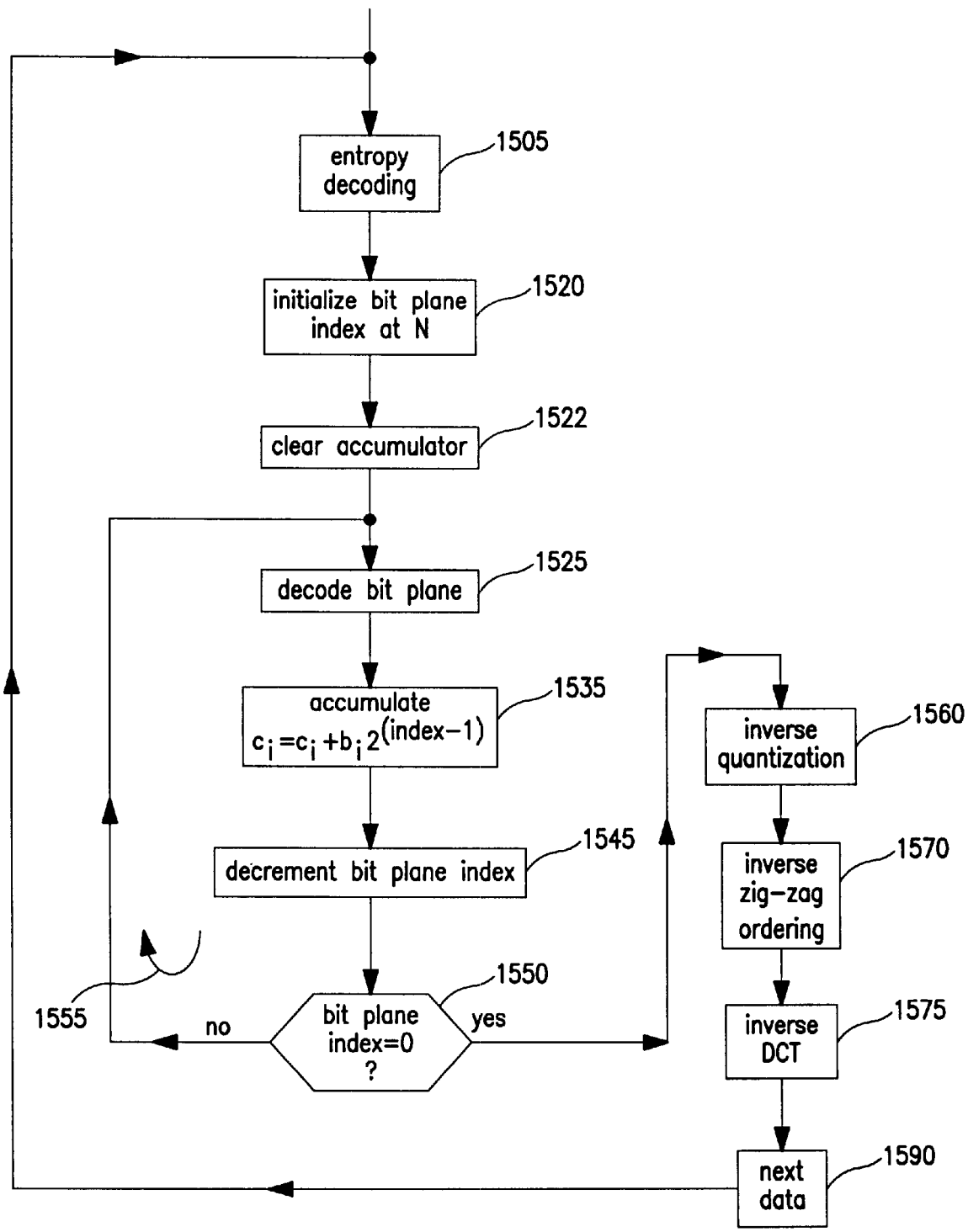
FIG. 15 is a flow diagram of a routine for controlling the decoder processor to implement decoding of encoded signals in accordance with an embodiment of the invention, the signals having been encoded in accordance with the routine of FIG. 11.

Referring to FIG. 15, there is shown a flow diagram of a routine for controlling a processor, such as the processor 160 of the decoder subsystem 155, to decode received encoded signals that were originally encoded, for example, using the DCT (run, end) bit plane routine described in conjunction with FIG. 12. After entropy decoding (if necessary), as represented by the block 1505, a bit plane index is initialized at N, as represented by the block 1520. [As previously noted, N can be explicitly or implicitly coded at the encoder, and is decoded at the decoder.] An accumulator, treated momentarily below, is cleared (block 1522). The encoded (run, end) bit stream at the current bit plane level is then decoded, as represented by the block 1525. This can be done, for example, by placing 1's at positions of a register determined by each run indication, and ending when an end indication is reached. An accumulate function (represented by block 1535) accumulates, for each coefficient value being decoded, a numerical value determined by 2 taken to the power (bit plane level minus one). This reconstructs each value by accumulating its ordered binary components. The bit plane index is then decremented (block 1545) and determination is made (decision block 1555) as to whether the bit plane index has reached zero. If not, the block 1525 is re-entered and the loop 1555 continues until all bit planes have been processed. When the inquiry of decision block 1550 is answered in the affirmative, the block 1560 is entered, and inverse quantization (e.g. multiplication by a suitable factor) is implemented on the individual accumulated values. Then, as represented by the block 1570, inverse zig-zag ordering is implemented to place the recovered DCT coefficients in appropriate position for inverse DCT operation, which is, in turn, represented by the block 1575. The next data can then be processed, as indicated by block 1590.

Figure 16:
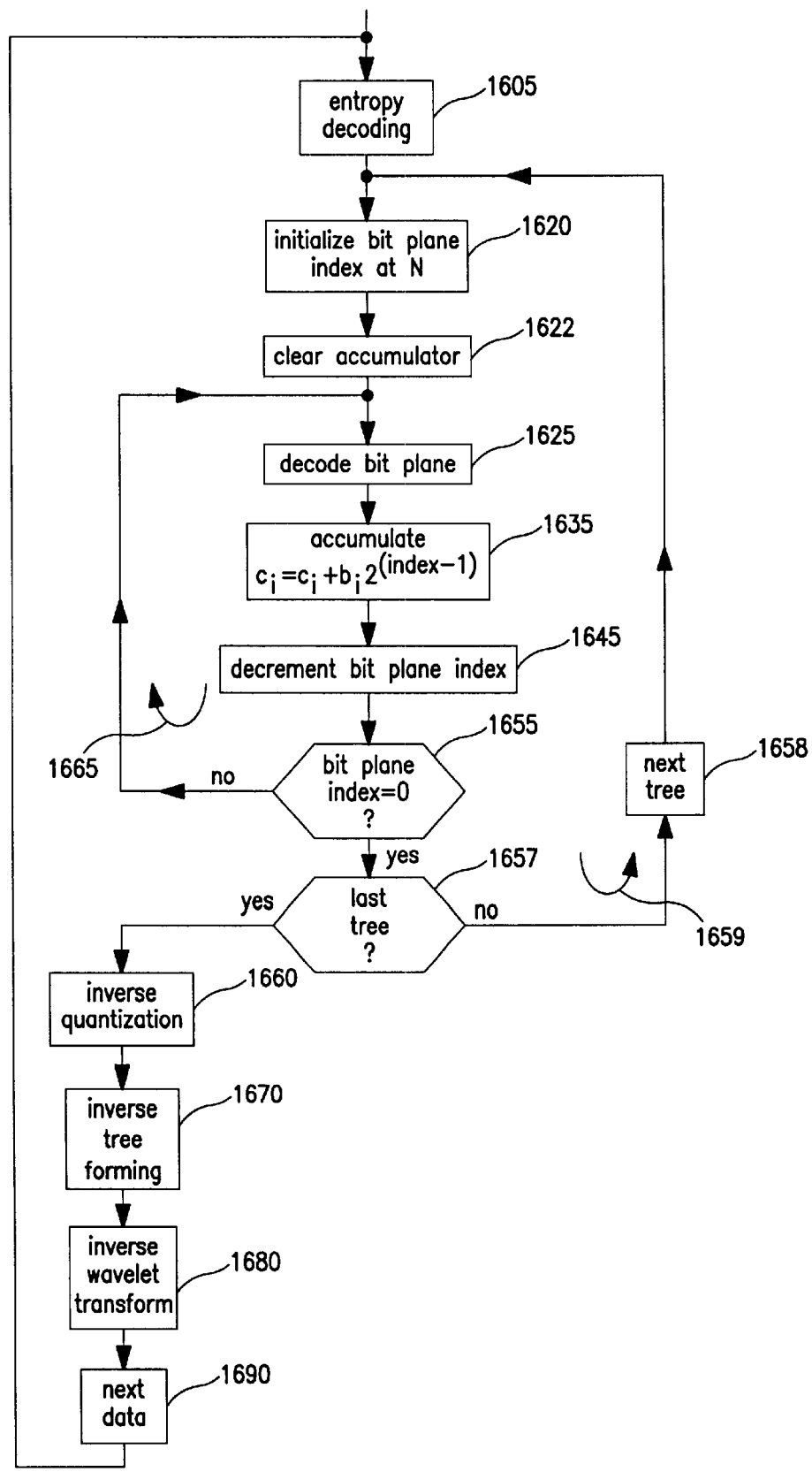
FIG. 16 is a flow diagram of a routine for controlling the decoder processor to implement decoding of encoded signals in accordance with an embodiment of the invention, the signals having been encoded in accordance with the routine of FIG. 12.

Referring to FIG. 16 there is shown a flow diagram of a routine for controlling a processor, such as the processor 160 of the decoder subsystem 155, to decode received encoded signals that were originally encoded, for example, using the technique described in conjunction with the flow diagram of FIG. 13 which used a wavelet transform and wavelet tree processing. After entropy decoding (if necessary), as represented by the block 1605, a bit plane index is initialized at N, as represented by the block 1620. An accumulator is cleared (block 1622). The encoded bit stream at the current bit plane level is then decoded, as represented by the block 1625. This can be done, for example, by placing 1's at appropriate positions of a register having positions that correspond to the tree elements, the register being loaded in accordance with the zero tree rules previously set forth; that is, with the value bit determining the value (1 or 0) of the element, and the end bit (the second bit of the bit pair) determining whether there are subsequent bits for the progeny of the element. An accumulate function (represented by block 1635) accumulates, for each coefficient value being decoded, a numerical value determined by 2 taken to the power (bit plane level minus one). This reconstructs each value by accumulating its ordered binary components. The bit plane index is then decremented (block 1645) and determination is made (decision block 1655) as to whether the bit plane index has reached zero. If not, the block 1625 is re-entered and the loop 1665 continues until all bit planes have been processed. When the inquiry of decision block 1650 is answered in the affirmative, the decision block 1657 is entered, and inquiry is made as to whether the last tree has been processed. If not, the next tree is considered (block 1658) an the loop 1659 continues as all trees are considered. Next, the block 1660 is entered, and inverse quantization (e.g. multiplication by a suitable factor) is implemented on the individual accumulated values. Then, as represented by the block 1670, inverse tree forming is implemented, followed by inverse wavelet transform (block 1680). The next data can then be processed, as indicated by block 1690.

Figure 17:
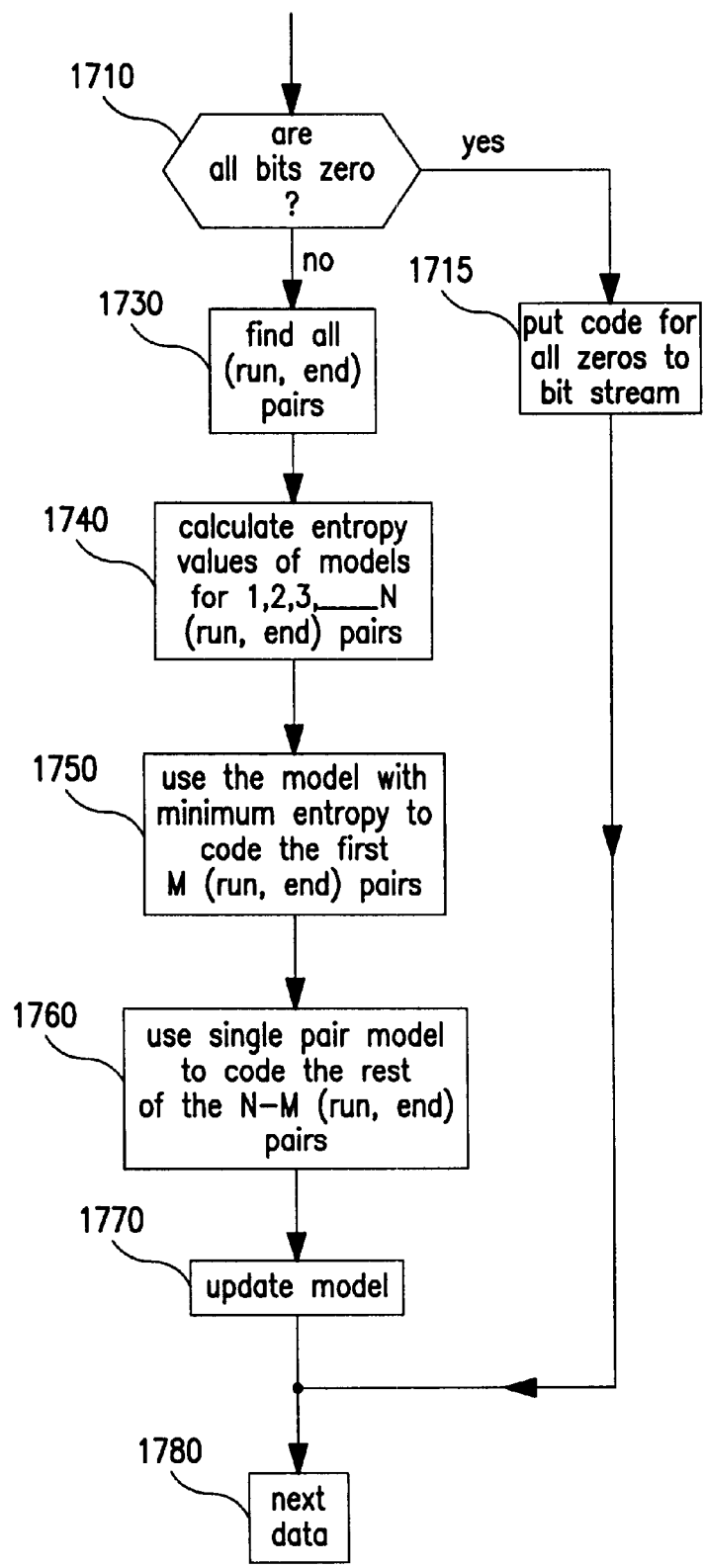
FIG. 17 is a flow diagram of a routine that can be utilized to program the encoder processor in accordance with another embodiment of the invention.

As described above, in embodiments of the present invention, such as the embodiments hereof, entropy coding can be utilized, for example, after the described encoding, and then with initial entropy decoding at the decoder end, to enhance efficiency. The bit plane coding hereof is well adapted for efficiency gains using entropy coding or using the dimension adaptive type of entropy coding to be described next. In dimension adaptive entropy coding, one can encode occurrences of permutations of encoded values (such as permutations of the encoded number pairs developed above from the DCT bit plane coding or the wavelet tree bit plane coding) instead of just entropy coding the individual coded number pairs. An illustrative embodiment is described in conjunction with the flow diagram of FIG. 17 which describes a routine for entropy encoding the bit plane encoded DCT values as first described above in conjunction with the routine of FIG. 11. In the routine of FIG. 17, determination is made (decision block 1710) as to whether all bits are zero. If so, a code for all zeros is put to the bit stream (block 1715). If not, the block 1730 is entered, this block representing the finding of all (run, end) pairs. Next, as represented by the block 1740, the entropy values for all models are calculated for permutations of 1, 2, 3, . . . N (run, end) pairs, where N is the number of (run, end) pairs. Next, as represented by the block 1750, the model with minimum entropy is used to code the first M (run, end) pairs, where M is the number of pairs that provide the minimum entropy. Thus, for example, in a given situation, M might be 3 (run, end) pairs, and these will be coded. Then, as represented by the block 1760, the single coded number pair model is used to code the rest of the N-M (run, end) pairs. The model is then updated, as represented by the block 1770, and the next data can be awaited, as represented by the block 1780. At the decoding end, the decoder model will be synchronous with the encoder model to recover the (run, end) pairs.

Figure 18:
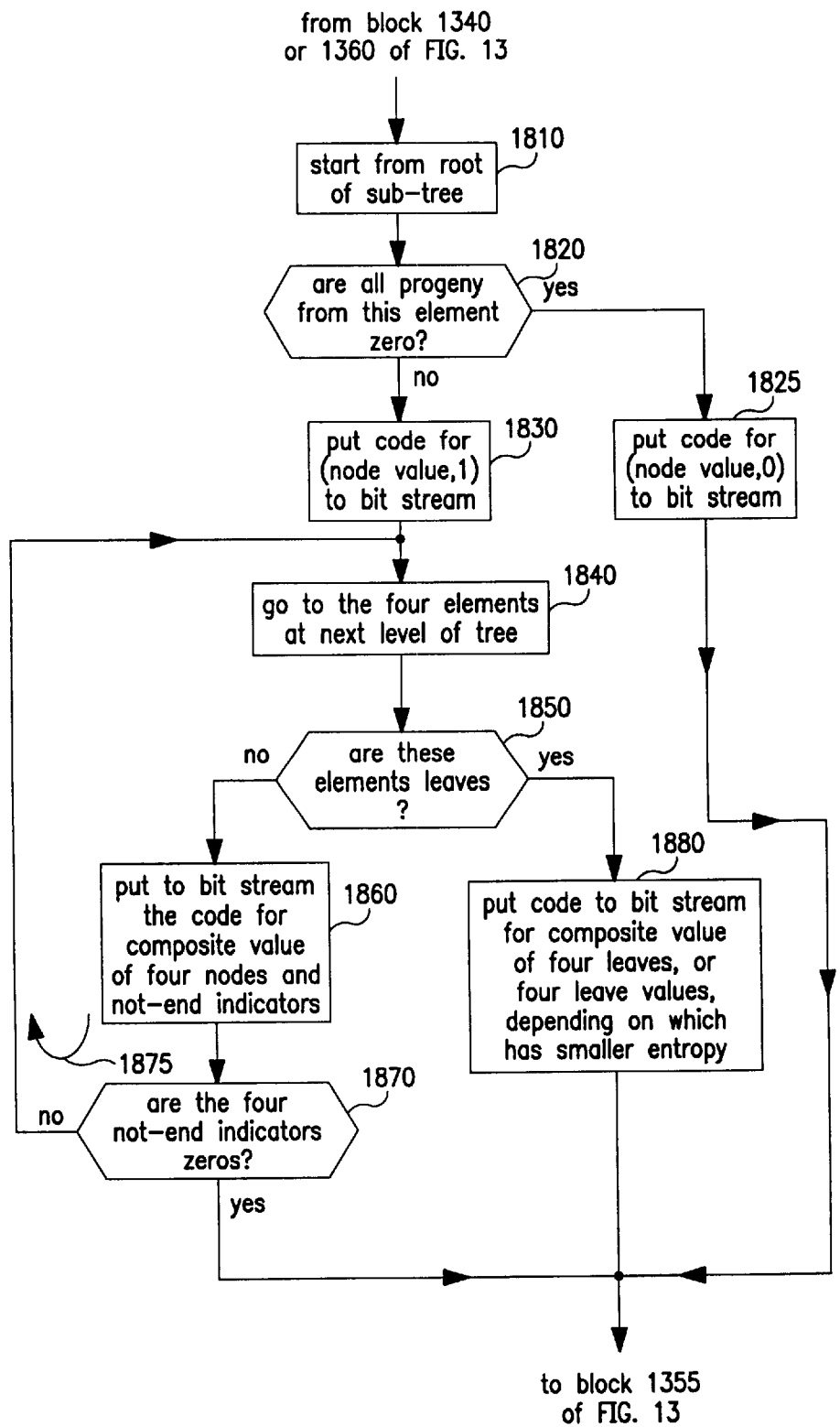
FIG. 18 is a flow diagram of a routine that can be utilized to program the encoder processor in accordance with a further embodiment of the invention.

FIG. 18 illustrates how a form of dimension adaptive entropy coding can be used for coding the bit planes of a wavelet tree, as first represented in FIG. 14 above. Block 1810 represents starting from the root of the sub-tree. Inquiry is made (decision block 1820) as to whether all progeny of this node are zero. If so, a code for (node value, 0) is put to the bit stream (block 1825). If not, a code for (node value, 1) is put to the bit stream (block 1830), and the block 1840 is entered. The block 1840 represents going to the four elements at the next level of the tree. Determination is made (decision block 1850) as to whether they are leaves. If not, the block 1860 is entered, this block representing putting to the bit stream a code for composite value of the four nodes and not-end indicators. Determination is then made (decision block 1870) as to whether the four not-end indicators are zeros. If not, the block 1840 is re-entered, and the loop 1875 continues until the inquiry of block 1870 is answered in the affirmative. Returning to the decision block 1850, when the four elements are leaves (i.e., in the last level of the tree), the block 1880 is entered, this block representing putting to the bit stream either a code for the composite value of the four leaves or the four node values, depending on which one has the smaller entropy value. As before, at the decoding end the decoder model will be synchronous with the encoder model, in this case to recover the tree element values.

What is claimed is:

1. A method for encoding and decoding an input signal, comprising the steps of:

applying a transform to said signal to obtain a transformed signal;

quantizing said transformed signal to obtain a sequence of quantized values, said quantized values being representable in the form of ordered binary bits, said quantizing further comprising determining the largest of said quantized values, and determining the number of orders, N, of said binary bits as the number of binary bits necessary to represent said largest value;

for each order of said binary bits, encoding a bit plane of said sequence using (run, end) coding to obtain encoded values; and decoding said encoded values to recover said input signal.

2. The method as defined by claim 1, wherein there are several orders of said bits.

3. The method as defined by claim 1, wherein said step of applying a transform to said signal to obtain a transformed signal comprises applying a discrete cosine transform to said signal.

4. The method as defined by claim 2, wherein said step of applying a transform to said signal to obtain a transformed signal comprises applying a discrete cosine transform to said signal.

5. The method as defined by claim 2, wherein said step of applying a transform to said signal to obtain a transformed signal comprises applying a discrete cosine transform to said signal.

6. The method as defined by claim 1, wherein said encoding further comprises entropy coding after said (run, end) coding of each order of said binary bits.

7. The method as defined by claim 5, wherein said encoding further comprises entropy coding after said (run, end) coding of each order of said binary bits.

8. The method as defined by claim 6, wherein said entropy coding comprises determining the entropy of different numbers of permutations of N coded (run, end) pairs, and selecting an entropy coding model based on said determination.

9. The method as defined by claim 7, wherein said entropy coding comprises determining the entropy of different numbers of permutations of N coded (run, end) pairs, and selecting an entropy coding model based on said determination.

10. The method as defined by claim 1, further comprising transmitting said encoded values as an encoded signal, and receiving the encoded signal before the decoding thereof.

11. The method as defined by claim 1, further comprising storing said encoded values as an encoded signal, and retrieving the encoded signal before the decoding thereof.

12. A method for encoding and decoding an input signal, comprising the steps of:

applying a wavelet transform to said signal to obtain a transformed signal;

forming a wavelet tree from said transformed signal, elements of said tree having values that depend on coefficients of said transformed signal;

quantizing the wavelet tree element values, said quantized element values being representable in the form of ordered binary bits, said quantizing further comprising determining the largest of said quantized values, and determining the number of orders, N, of said binary bits as the number of binary bits necessary to represent said largest value;

for each order of said binary bits, encoding a bit plane of said wavelet tree element values using (value, end) coding to obtain encoded values; and decoding said encoded values to recover said input signal.

13. The method as defined by claim 12, wherein there are several orders of said binary bits.

14. The method as defined by claim 13, wherein said encoding further comprises entropy coding after said (value, end) coding of each order of said binary bits.

15. The method as defined by claim 14, wherein said entropy coding comprises determining the entropy of different numbers of permutations of N coded (value, end) pairs, and selecting an entropy coding model based on said determination.

16. The method as defined by claim 12, further comprising transmitting said encoded values as an encoded signal, and receiving the encoded signal before the decoding thereof.

17. The method as defined by claim 12, further comprising storing said encoded values as an encoded signal, and retrieving the encoded signal before the decoding thereof.

18. Apparatus for encoding and decoding an input signal, comprising:

means for applying a transform to said signal to obtain a transformed signal;

means for quantizing said transformed signal to obtain a sequence of quantized values, said quantized values being representable in the form of ordered binary bits, said quantizing means further comprising means for determining the largest of said quantized values, and means for determining the number of orders, N, of said binary bits as the number of binary bits necessary to represent said largest value;

means, operative for each order of said binary bits, for encoding a bit plane of said sequence using (run, end) coding to obtain encoded values; and means for decoding said encoded values to recover said input signal.

19. Apparatus as defined by claim 18, wherein said means for applying a transform to said signal to obtain a transformed signal comprises means for applying a discrete cosine transform to said signal.

20. Apparatus as defined by claim 19, wherein said means for encoding further comprises means for entropy coding after said (run, end) coding of each order of said binary bits.

21. Apparatus as defined by claim 20, wherein said means for entropy coding comprises means for determining the entropy of different numbers of permutations of N coded (run, end) pairs, and means for selecting an entropy coding model based on said determination.

22. Apparatus for encoding and decoding an input signal, comprising:

means for applying a wavelet transform to said signal to obtain a transformed signal;

means for forming a wavelet tree from said transformed signal, elements of said tree having values that depend on coefficients of said transformed signal;

means for quantizing the wavelet tree element values, said quantized element values being representable in the form of ordered binary bits, said quantizing means further comprising means for determining the largest of said quantized values, and means for determining the number of orders, N, of said binary bits as the number of binary bits necessary to represent said largest value;

means, operative for each order of said binary bits, for encoding a bit plane of said wavelet tree element values using (value, end) coding to obtain encoded values; and means for decoding said encoded values to recover said input signal.

23. Apparatus as defined by claim 22, wherein said means for encoding further comprises means for entropy coding after said (value, end) coding of each order of said binary bits.

24. Apparatus as defined by claim 23, wherein said means for entropy coding comprises means for determining the entropy of different numbers of permutations of N coded (value, end) pairs, and means for selecting an entropy coding model based on said determination.

25. For use in a method for encoding and decoding an input signal, the encoding comprising the steps of: applying a transform to said signal to obtain a transformed signal; quantizing said transformed signal to obtain a sequence of quantized values, said quantized values being representable in the form of ordered binary bits, said quantizing further comprising determining the largest of said quantized values, and determining the number of orders, N, of said binary bits as the number of binary bits necessary to represent said largest value; and for each order of said binary bits, encoding a bit plane of said sequence using (run, end) coding to obtain encoded values; a method for decoding said encoded values to recover said input signal, comprising the steps of:

for each order of said binary bits, decoding a bit plane of said encoded values to obtain decoded bit plane values;

accumulating the decoded bit plane values; and inverse transforming the accumulated decoded bit plane values.

26. A method for encoding an input signal, comprising the steps of:

applying a transform to said signal to obtain a transformed signal;

quantizing said transformed signal to obtain a sequence of quantized values, said quantized values being representable in the form of ordered binary bits, said quantizing further comprising determining the largest of said quantized values, and determining the number of orders, N, of said binary bits as the number of binary bits necessary to represent said largest value; and for each order of said binary bits, encoding a bit plane of said sequence using (run, end) coding to obtain encoded values.

\* \* \* \* \*